United States Patent
Lin et al.

(10) Patent No.: US 6,714,704 B2
(45) Date of Patent: Mar. 30, 2004

(54) OPTICAL COMPONENT HAVING SELECTED BANDWIDTH

(75) Inventors: Wenhua Lin, Pasadena, CA (US); Jen-yu Fan, Aracdia, CA (US)

(73) Assignee: Lightcross, Inc.

( * ) Notice: Subject to any disclaimer, the term of this patent is extended or adjusted under 35 U.S.C. 154(b) by 85 days.

(21) Appl. No.: 09/998,381

(22) Filed: Nov. 29, 2001

(65) Prior Publication Data

US 2003/0099436 A1 May 29, 2003

(51) Int. Cl.⁷ ............................................. G02B 6/34
(52) U.S. Cl. .............................. 385/37; 385/14; 385/15; 385/24; 385/27; 385/43; 385/46
(58) Field of Search .................... 385/14, 15, 37, 385/43, 46, 24, 27

(56) References Cited

U.S. PATENT DOCUMENTS

| | | | |
|---|---|---|---|
| 4,618,210 A | 10/1986 | Kondo | |
| 4,747,654 A | 5/1988 | Yi-Yan | |
| 4,813,757 A | 3/1989 | Sakano et al. | |
| 4,846,542 A | 7/1989 | Okayama | |
| 5,002,350 A | 3/1991 | Dragone | |
| 5,013,113 A | 5/1991 | Soref | |
| 5,039,993 A | 8/1991 | Dragone | |
| 5,243,672 A | 9/1993 | Dragone | |
| 5,412,744 A | 5/1995 | Dragone | |
| 5,450,511 A | 9/1995 | Dragone | |
| 5,467,418 A | 11/1995 | Dragone | |
| 5,581,643 A | 12/1996 | Wu | |
| 5,680,236 A | * 10/1997 | Van Der Tol | 359/127 |
| 5,706,377 A | 1/1998 | Li | |
| 5,748,811 A | * 5/1998 | Amersfoort et al. | 385/15 |
| 5,841,931 A | 11/1998 | Foresi et al. | |
| 5,938,811 A | 8/1999 | Greene | |
| 6,049,644 A | * 4/2000 | Dragone | 385/37 |
| 6,069,990 A | * 5/2000 | Okawa et al. | 385/43 |
| 6,108,478 A | 8/2000 | Harpon et al. | |
| 6,118,909 A | 9/2000 | Chen et al. | |
| 6,195,482 B1 | * 2/2001 | Dragone | 385/28 |
| 2002/0001433 A1 | * 1/2002 | Hosoi | 385/37 |
| 2002/0057865 A1 | * 5/2002 | Katayama | 385/24 |
| 2002/0159703 A1 | * 10/2002 | McGreer | 385/43 |

FOREIGN PATENT DOCUMENTS

| | | | |
|---|---|---|---|
| EP | 0647861 A1 | 4/1995 | |
| EP | 0985942 A2 | 3/2000 | |
| GB | 2349957 A | * 11/2000 | G02B/6/10 |
| JP | 63-197923 | 8/1988 | |
| JP | 2-179621 | 7/1990 | |
| JP | 6-186598 | 7/1994 | |

OTHER PUBLICATIONS

Abe, et al., Optical Path Length Trimming Technique using Thin–Film Heaters for Silica–Based Waveguides on Si, Electronics Letters, Sep. 12, 1996, vol. 32–No. 19, pp. 1818–1820.

(List continued on next page.)

*Primary Examiner*—Hemang Sanghavi
*Assistant Examiner*—Scott Knauss
(74) *Attorney, Agent, or Firm*—Law Offices of Travis L. Dodd, P.C.

(57) ABSTRACT

An optical component is disclosed. The optical component includes an input waveguide having an expansion region expanding from an input port to a multimode port. The expansion region is configured to receive a light signal through the input port. An array waveguide grating is configured to receive a light signal from the expansion region of the input waveguide. An output waveguide has an output port configured to receive the light signal from the array waveguide grating. The output port has dimensions that are different from dimensions of the input port. In some instances, a function expressing the expansion from the input port to the multimode port includes an exponential function and/or a sinh function.

31 Claims, 5 Drawing Sheets

OTHER PUBLICATIONS

Albert, J., Planar Fresnel Lens Photoimprinted in a Germanium–Doped Silica Optical Waveguide, Optics Letters, May 15, 1995, vol. 20–No. 10, pp. 1136–1138.

Aman, M.C., Calculation of Metal–Clad Ridge–Waveguide (MCRW) Laser Modes by Mode Coupling Technique, Journal of Lightwave Technology, vol. LT–4, No. 6, Jun. 1986, p. 689–693.

Amann, M.C. et al, Calculation Of The Effective Refractive–Index Step For The Metal–Cladded–Ridge–Waveguide Laser, Applied Optics, vol. 20, No. 8, Apr. 15, 1981, p. 1483–1486.

Baba, S. et al., A Novel Integrated–Twin–Guide (ITG) Optical Switch with a Built–in TIR Region, IEEE Photonics Technology Letters; vol. 4, No. 5, May 1992, p. 486–488.

Benson, T.M., Etched–Wall Bent–Guide Structure for Integrated Optics in the III–V Semiconductors; Journal of Lightwave Technology, vol. LT–2, No. 1, Feb. 1984; p. 31–34.

Berry, G.M. et al., Analysis Of Multiplayer Semiconductor Rib Waveguides With High Refractive Index Substrates, Electronics Letters; vol. 29, No. 22; Oct. 28, 1993, p. 1941–1942.

Betty, I. et al., A Robust, Low–Crosstalk, InGaAsP/InP Total–Internal–Reflection Switch For Optical Cross–Connect Application.

Burke, S.V., Spectral Index Method Applied to Coupled Rib Waveguides; Electronics Letters, vol. 25, No. 9, Apr. 27, 1989, p. 605–606.

Burns, W.K. et al., Mode Conversion in Planar–Dielectric Separating Waveguides; IEEE Journal of Quantum Electronics, vol. QE–11, No. 1, Jan. 1975; p. 32–39.

Cai, Y. et al., A Novel Three–Guide Optical Coupler Using A Taper–Formed Waveguide; j. Appl. Phys 69(5), Mar. 1991; p. 2810–2814.

Cavailles, J.A. et al., First Digital Optical Switch Based on InP/GaInAsP Double Heterostructure Waveguides; Electronics Letters, vol. 27, No. 9, Apr. 25, 1991, p. 699–700.

Chen, R.T. et al., Design and Manufacturing of WDM Devices; Proceedings of SPIE vol. 3234.

Clemens, et al., Wavelength–Adaptable Optical Phased Array in $SiO_2$–Si, Photonics Technology Letters, Oct. 1995, vol. 7–No. 10, 1040–1041.

Dagli, N. et al., Analysis of Rib Dielectric Waveguides; IEEE Journal of Quantum Electronics, vol. QE–21, No. 4, Apr. 1985, p. 315–321.

Dagli, N. et al., Theoretical and Experimental Study of the Analysis and Modeling of Integrated Optical Components; IEEE Journal of Quantum electronics, vol. 24, No. 11, Nov. 1988; p. 2215–2226.

Deri, R.J., et al., Low–Loss GaAs/AlGaAs Waveguide Phase Modulator Using A W–Shaped Index Profile; Sep. 6, 1988.

Deri, R.J., et al., Low–Loss Multiple Quantum Well GaInAs/InP Optical Waveguides; Feb. 21, 1989.

Devaux, F. et al., 20Gbit/s Operation of a High–Efficiency InGaAsP/InGaAsP MQW Electroabsorption Modulator With 1.2–V Drive Voltage; IEEE Photonics Technology Letters, vol. 5, No. 11, Nov. 1993, p. 1288–1290.

Doerr, C.R. et al., Chirping Of The Waveguide Grating Router For Free–Spectral–Range Mode Selection In The Multifrequency Laser, IEEE Photonics Technology Letters, Apr. 1996, vol. 8–No. 4, pp. 500–502.

Doerr, C.R. et al., Chromatic Focal lane Displacement in the Parabolic Chirped Waveguide Grating Router, May 1997, vol. 9–No. 5, pp. 625–627.

Dragone, c. Efficient NxN Star Couplers Using Fourier Optics, pp. 479–448, Mar. 1989, vol. 7–No. 3, Journal of Lightwave Technology.

Fischer, et al., Singlemode Optical Switches Based on SOI Waveguides with Large Cross–Section, Electronics Letters, Mar. 3, 1994, vol. 30–No. 5, pp. 406–408.

Fischer, K. et al, Sensor Application Of SiON Integrated Optical Waveguides On Silicon; Elevier Sequoia, 1992; p. 209–213.

Fish, G. et al., Monolithic InP Optical Crossconnects: 4x4 and Beyond, JWB2–1M, p. 19–21.

Furuta, H. et al, Novel Optical Waveguide For Integrated Optics, Applied Optics, vol. 13, No. 2, Feb. 1974, p. 322–326.

Gini, E. et al., Low Loss Self–Aligned Optical Waveguide Corner Mirrors in InGaAs/InP, We P2.22.

Goel, K. et al Design Considerations for Low Switching Voltage Crossing Channel Switches; Journal of Lightwave Technology, vol. 6, No. 6, Jun. 1988; p. 881–886.

Granestrand, P. et al., Integrated Optics 4x4 Switch Matrix with Digital Optical Switches; Electronics Letters, vol. 26, No. 1, Jan. 4, 1990; p. 4–5.

Himeno, a. et al., Loss Measurement and Analysis of High–Silica Reflection Bending Optical Waveguides, Journal of Lightwave Technology, Jan. 1988, vol. 6–No. 1, 41–46.

Hsu, K.Y. et al., Photonics devices and Modules, www.c-c.nctu.edu.tw/~ctr/lee_mti/research_topic/photonic_devices_modules.htm, pp. 1–3.

Huang, T.C. et al., Depletion Edge Translation Waveguide Crossing Optical Switch; IEEE Photonics Technology Letters; vol. 1, No. 7, Jul. 1989, p. 168–170.

Hutcheson, L.D. et al., Comparison of Bending Losses in Integrated Optical Circuits; Optics Letters, vol. 5, No. 6, Jun. 1980, p. 360–362.

Inoue, H. et al, Low Loss GaAs Optical Waveguides, Journal of Lightwave Technology, vol. LT–3, No. 6, Dec. 1985; p. 204–209.

Irace, A. et al., Fast Silicon–on–Silicon Optoelectronic Router Based on a BMFET Device, Journal of Selected Topics in Quantum Electronics, Jan./Feb. 2000, vol. 6–No. 1, pp. 14–18.

Ito, F. et al., Carrier–Injection–Type Optical Switch In GaAs With A 1.06–1.55 $\mu$m Wavelength Range; Appl. Physics Letters, 54(2) Jan. 9, 1989; p. 134–136.

Jackman, N. et al., Optical Cross Connects for Optical Networking; Bell Labs Technical Journal, Jan.–Mar. 1999; p. 262–281.

Johnston, I.R., et al., Silicon–Based Fabrication Process For Production Of Optical Waveguides; IEE Proc–Optoelectron., vol. 143, No. 1, Feb. 1996,p. 37–40.

Kaenko, A. et al., Athermal Silica–based Arrayedwaveguide Grating (AWG) Multiplexers with New Loss Groove Design; Tu01–1, p. 204–206.

Kasahara, R. et al., Low–Power Consumption Slica–Based 2x2 Thermooptic Switch Using Trenched Substrate, IEEE Photonics Technology Letters, vol. 11, No. 9, Sep. 1999, p. 1132–1134.

Khan, M.N. et al., Fabrication–Tolerant, Low–Loss, and High–Speed Digital Optical Switches in InGaAsP/InP Quantum Wells; Proc $21^{st}$ Eur.Conf.on Opt.Comm.(ECOC '95–Brussels), p. 103–106.

Khan, M.N. et al., High–Speed Operation of Quantum Well Electron Transfer Digital Optical Switches; p. 102–102c.

Kirihara, T. et al., Lossless And Low Crosstalk 4×4 Optical Switch Array; Electronics And Communication in Japan, Part 2, vol. 77, No. 11, 1994, p. 73–81.

Kirihara, T. et al., Lossless and Low–Crosstalk Characteristics in an InP–Based 2×2 Optical Switch, IEEE Photonics Technology Letters, vol. 5, No. 9 Sep. 1993, p. 1059–1061.

Kokubun, Y. et al., Athermal Waveguides for Temperature–Independent Lightwave Devices, Nov. 1993, 1297–1298, vol. 5–No. 11, IEEE Photonics Technology Letters.

Kokubun, Y. et al., Temperature–Independent Narrowband Optical Filter at 1.3 μm Wavelength by an Athermal Waveguide, Oct. $10^{th}$, 1996, vol. 32–No. 21, Electronics Letters.

Kokubun, Y. et al., Temperature–Independent Optical Filter at 1.55 μm Waveguide Using a Silica–Based Athermal Waveguide, Feb. 19, 1998, vol. 34–No. 4, Electronics Letters.

Kokubun, Y. et al., Three–Dimensional Athermal Waveguides for Temperature Independent Lightwave Devices, Jul. $21^{st}$, 1994, vol. 30–No. 15, Electronics Letters.

Kostrzewa, C. et al., Tunable Polymer Optical Add/Drop Filter for Multiwavelength Networks, Photonics Technology Letters, Nov. 1997, vol. 9–No. 11, 1487–1489.

Laakman, K. D. et al., Waveguides: Characteristic Modes Of Hollow Rectangular Dielectric Waveguides; Applied Optics, vol. 15, No. 5, May 1976; p. 1334–1340.

Lee, T.P. et al., $Al_xGa_{1-x}As$ Double–Heterostructure Rib–Waveguide Injection Laser; IEEE Journal of Quantum Electronics; vol. QE–11, No. 7, Jul. 1975; p. 432–435.

Liu, Y.L. et al., Silicon 1×2 Digital Optical Switch Using Plasma Dispersion; Electronics Letters, vol. 30, No. 2, Jan. 20, 1994; p. 130–131.

Mak, G. et al., High–Speed Bulk InGaAsP–InP Electroabsorption Modulators with Bandwidth in Excess of 20 GHz, IEEE Photonics Technology Letter, vol. 2, No. 10, Oct. 1990, p. 730–733.

Marcatili, E., Improved Coupled–Mode Equations for Dielectric Guides; IEEE Journal of Quantum Electronics, vol. QE–22, No. 6, Jun. 1986, p 988–993.

Marcatili, E.A.J., Bends in Optical Dielectric Guides; The Bell System Technical Journal, Sep. 1969; p. 2103–2132.

Marcatili, E.A.J., Dielectric Rectangular Waveguide and Directional Coupler for Integrated Optics, The Bell System Technical Journal, Sep. 1969 p. 2071–2101.

Marcatili, E.A.J., Slab–Coupled Waveguides; The Bell System Technical Journal, Apr. 1974; American Telephone & Telegraph Company, vol. 53, No. 4, Apr. 1974.

Mirza, A.R. et al, Silicon Wafer Bonding For MEMS Manufacturing, Solid State Technology, Aug. 1999, p. 73–78.

Moerman, I. et al., A Review on Fabrication Technologies for the Monolithic Integration of Tapers with III–V Semiconductor Devices; IEEE Journal of Selected Topics in Quantum electronics, vol. 3, No. 6, Dec. 1997, p. 1308–1320.

Müller, G. etal., First Low Loss InP/InGaAsP Optical Switch with Integrated Mode Transformer; ThC12.10; p. 37–40.

Nayyer, J. et al., Analysis of Reflection–Type Optical Switches with Intersecting Waveguides, Journal of Lightwave Technology, vol. 6, No. 6, Jun. 1988; p. 1146–1152.

Negami, t. et al., Guided–Wave Optical Wavelength Demultiplexer Using An Asymmetric Y Junction; Appl. Phys. Lett. 54(12), Mar. 20, 1989; p. 1080–1082.

Nelson, W. et al., Optical Switching Expands Communications–Network Capacity; Laser Focus World, Jun. 1994, p. 517–520.

Nelson, W.H. et al., Wavelength–and Polarization–Independent Large Angle InP/InGaAsP Digital Optical Switches with Extinction Ratios Exceeding 20 dB; IEEE Photonics Technology Letters, vol. 6, No. 11, Nov. 1994; p. 1332–1334.

Noda, Y. et al., High–Speed Electroabsorption Modulator with Strip–Loaded GaInAsP Planar Waveguide; Journal of Lightwave Technology, vol. LT–4, No. 10, Oct. 1986, p. 1445–1453.

Offrein, B.J. etal., Resonant Coupler–Based Tunable Add-After–Drop Filter in Silicon–Oxynitride Technology for WDM Networks, Journal of Selected Topics in Quantum Electronics, vol. 5–No. 5, 1400–1405.

Okamoto, K. et al., Arrayed–Waveguide Grating Multiplexer With Flat Spectral Response; Optics Letters, Jan. 1, 1995; vol. 20, No. 1; p. 43–45.

Okamoto, K. et al., Flat Spectreal Response Arrayed-Waveguide Grating Multiplexer with Parabolic Waveguide Horns, Electronics Letters Online, Jul. 15, 1996, No. 19961120, pp. 1661–1662.

Okayama, H. et al., 8×8 $Ti:LiNbO_3$ Waveguide Digital Optical Switch Matrix; IEICE Trans. Commun.; vol. E77–B, No. 2; Feb. 1944; p. 204–208.

Okayama, H. et al., Dynamic Wavelength Selective Add/Drop Node Comprising Tunable Gratings, Electronics Letters Online, Apr. 10, 1997, No. 19970607.

Okayama, H. et al., Reduction of Voltage–Length Product for Y–Branch Digital Optical Switch, Journal of Lightwave Technology, vol. 11, No. 2, Feb. 1993; p. 379–387.

Okuno, M. et al., Strictly Nonblocking 16×16 Matrix Switch Using Silica Based Planar Lightwave Circuits, vol. 10, No. 266, Sep. 11, 1986.

Ooba, N. et al., Athermal Silica–Based Arrayed–Waveguide Grating Multiplexer Using Bimetal Plate Temperature Compensator, Electronics Letters, Oct. $12^{th}$, 2000, vol. 36, No. 21, pp. 1800–1801.

Renaud, M. et al., Compact Digital Optical Switches for Low Insertion Loss Large Switch Arrays on InP; Proc. $21^{st}$ Eur.Conf.on Opt. Comm. (ECOC '95–Brussels), p. 99–102.

Rickman, A.G. et al., Silicon–on–Insulator Optical Rib Wavelength Loss and Mode Characteristics, Journal of Ligthwave Technology, Oct. 1994, vol. 12–No. 10, pp. 1771–1776.

Rolland, C. et al., 10 Gbit/s, 1.56 μm, Multiquantum Well InP/InGaAsP Mach–Zehnder Optical Modulator, Electronics Letters, Mar. 4, 1993, vol. 29, No. 5, p. 471–472.

Santec Sales Brochure for year 2000 entitled "Optical Components".

Schauwecker, B. et al, Small–Size Silicon–Oxynitride AWG Demultiplexer Operating Around 725 nm, IEEE Photonics Technology Lettes, vol. 12, No. 12, Dec. 2000.

Schlachetzki, A. Monolithic IO–Technology–Modulators and Switches Based on InP; SPIE vol. 651 Integrated Optical Circuit Engineering III (1986), p. 60–66.

Silberberg, Y. et al., Digital Optical Switch; Appl. Phys. Lett; vol. 51, No. 16, Oct. 19, 1987, p. 152–154.

Smit, M.K., New Focusing and Dispersive Planar Component Based on an Optical Phased Array; Electronics Letters; Mar. 31, 1988, vol. 24, No. 7; p. 385–386.

Smith, S.D. et al., CW Operation of Corner Cavity Semiconductor Lasers; IEEE Photonics Technology Letters, vol. 5, No. 8, Aug. 1993; p. 876–879.

Sneh, A. et al., Compact Low Crosstalk and Low Propagation Loss Quantum–Well Y–Branch Switches; PDP 4–1~4–5.

Soole, J.B.D. et al., Use of Multimode Interference Couplers to Broaden the Passband on Wavelength–Disperse Integrated WDM Filters; IEEE Photonics Technology Letters, vol. 8, No. 10, Oct. 1996; p. 1340–1342.

Stoll, L. etal., 1:8 Optical Matrix Switch on InP/InGaAsP with Integrated Mode Transformers; Optical Switches and Modulators II, p. 531–534.

Stoll, L. et al., Compact and Polarization Independent Optical Switch on InP/InGaAsP; TuB7.2; p. 337–340.

Stutius, W. et al., Silicon Nitride Films On Silicon For Optical Waveguides, Applied Optics, vol. 16, No. 12, Dec. 1977, p. 303–307.

Sugie, T. et al., 1.3-$\mu$m Laser Diodes with a Butt–jointed Selectively Grown Spot–Size Converter; ThB2–6, IOOC95, p. 52–53.

Tada, K. et al., Bipolar Transistor Carrier–Injected Optical Modulator/Switch: Proposal and Analysis, IEEE Electron Device Letters, vol. EDL–7, No. 11, Nov. 1986, p. 605–606.

Takada, et al., Optical Spectrum analyzer using Cascaded AWG's with Different Channel Spacings, Photonics Technology Letters, Jul. 1999, vol. 11, No. 7, pp. 863–864.

Takahashi, H. et al., Arrayed Waveguide Grating for Wavelength Division Multi/Demultilexer with Nanometre Resolution, PWG–NTT–7.

Takiguchi, K. et al, Dispersion Compensation Using a Planar Lightwave Circuit Optical Equalizer, Photonics Technology Letters, Apr. 1994, vol. 6, No. 4, pp. 561–564.

Tien, P.K. et al., Formation of Light–Guiding Interconnections in an Integrated Optical Circuit by Composite Tapered-Film Coupling; Applied Optics, vol. 12, No. 8, Aug. 1973; p. 1909–1916.

Toyoda, et al., Thermoplastic Switch and Wavelength Tunable Filter using Polymer Waveguides, Abstract of paper presented at Opticomm 2001 on Aug. 22, 2001.

Treyz, G.V. et al., Silicon Optical Modulators at 1.3 $\mu$m Based on Free–Carrier Absorption; IEEE Electron Device Letters, vol. 12, No. 6, Jun. 1991; p. 276–278.

Tsuda, H. et al., Performance Analysis of a Dispersion Compensator Using Arrayed–Waveguide Gratings, Journal of Lightwave Technology, Aug. 2000, vol. 18–No. 8, pp. 1139–1147.

Tsude, H. et al., Second–and Third–Order Dispersion Compensator Using a High–Resolution Arrayed Waveguide Grating, IEEE Photonics Technology Letters, May 1999, vol. 11–No. 5, 569–571.

Vinchant et al, InP 4×4 Digital–Optical–Switch Module For Multiwavelength Cross–Connect Applications; OFC '95 Technical Digest, Thursday TkK2, p. 281–282.

Vinchant, J.F. et al., First Polarisation insensitive 4×4 Switch matrix on InP with Digital Optical Switches, TuB7.3, p. 341–344.

Vinchant, J.F. et al., InP Digital Optical Switch: Key Element for Guided–Wave Photonic Switching; IEE Proceedings–J, vol. 140, No. 5, Oct. 1993; p. 301–307.

Vinchant, J.F. et al., Low Driving Voltage or Current Digital Optical Switch on InP for Multiwavelength Syste Applications; Electronics Letters, vol. 28, No. 12, Jun. 4, 1992; p. 1135–1137.

Wakita, K. et al., Long Wavelength Waveguide Multiple Quantum Well Optical Modulators; IEEE Journal of Quantum Electronics, vol. QE–23, No. 12, Dec. 1987, p. 2210–2215.

Wanru, Z. et al., Total Internal Reflection Optical Switch with Injection Region Isolated by Oxygen Ion Implantation; p. 1–10.

Yamada, et al., Cross Talk Reduction in a 10 GHz Spacing Arrayed–Waveguide Grating by Phase–Error Compensation, Journal of Lightwave Technology, Mar. 1998, vol. 16–No. 3, pp. 364–371.

Yanagawa, H. et al., Polarization–and Wavelength–Insensitive Guided–Wave Optical Switch with Semiconductor Y Junction; Journal of Lightwave Technology, vol. 8, No. 8, Aug. 1990, p. 1192–1197.

Yu, S. et al., High Speed All–Optical Packet Routing Using A Vertical Coupler Crosspoint Space Switch.

Yu, S. et al., Ultralow Cross–Talk, compact integrated optical crosspoint space switch arrays employing active InGaAsP/InP Vertical Waveguide Couplers; Integrated Optical Crosspoint Switch Arrays, Siyuan Yu et a, CPD24–2.

Zengerle, R. et al., Tapered Twin Waveguides For Spot–Size Transformation In InP; TheB2–5; IOOC 95; p. 50–51.

Zirngibl, M. et al., Digitally Tunable Laser Based On The Integration Of A Waveguide Grating Multiplexer And An Optical Amplifier, IEEE Photonics Technology Letters, Apr. 1994, vol. 6–No. 4, pp. 516–517.

Zucker, J.E. et al., Strained Quantum Wells for Polarization-Independent Electrooptic Waveguide Switches, Journal of Lightwave Technology, vol. 10, No. 12, Dec. 1992, p. 1926–1930.

"Phased–array wavelength demultiplexer with flattened wavelength response", Amersfoort et al.,Electronics Letters, Feb. 17th, 1994, vol. 4, No. 4, pp. 300–302.*

* cited by examiner

OPTICAL COMPONENT HAVING SELECTED BANDWIDTH

BACKGROUND

1. Field of the Invention

The invention relates to optical components. In particular, the invention relates to optical components configured to produce light signals with a selectable bandwidth.

2. Background of the Invention

The wavelength division multiplexing technique allows a waveguide to carry more than one channel of information in a multichannel beam of light. Each channel is carried on a light signal having a unique wavelength.

Optical components such as demultiplexers are typically employed to separate the channels in a multichannel beam. Separating the channels allows the channels to be independently processed. The demultiplexer receives the multichannel beam on an input waveguide and outputs each of the channels on a different output waveguide. Accordingly, each output waveguide is typically associated with a particular channel.

Demultiplexers are often associated with a particular bandwidth. The bandwidth of a demultiplexer is associated with the range of wavelengths that are present in an output waveguide. For instance, the output waveguides of a demultiplexer with a wider bandwidth have a larger range of wavelengths than the output waveguides of a demultiplexer with a narrower bandwidth. Different applications for the demultiplexer often require different bandwidths. For instance, a wide and flattened bandwidth can relax the wavelength alignment requirement between a laser and a demultiplexer. As a result, there is a need for optical components configured to produce light signals with a desired of bandwidth.

SUMMARY OF THE INVENTION

The invention relates to an optical component. The optical component includes an input waveguide having an expansion region expanding from an input port to a multimode port. The expansion region is configured to receive a light signal through the input port. An array waveguide grating is configured to receive a light signal from the expansion region of the input waveguide. An output waveguide has an output port configured to receive the light signal from the array waveguide grating. The output port has dimensions that are different from dimensions of the input port. In some instances, the output port has an output port width that is different from a width of the input port.

A function expressing the expansion from the input port to the multimode port can include an exponential function and/or a sinh function.

Another embodiment of the optical component includes an input waveguide having an input port through which a light signal exits the input waveguide. An array waveguide grating is configured to receive the light signal from the input waveguide. An expansion region expands from an output port to a multimode port. The multimode port is configured to receive the light signal from the array waveguide grating. The output port has dimensions different from dimensions of the input port. In some instances, the output port has an output port width that is different from a width of the input port.

A function expressing the expansion from the output port to the multimode port can include an exponential function and/or a sinh function.

Another embodiment of the optical component includes an input waveguide having an expansion region expanding from an input port through which the expansion region is configured to receive light signals to a multimode port. A function expressing the expansion from the input port to the multimode port includes an exponential function. An array waveguide grating is configured to receive a light signal from the expansion region of the input waveguide. An output waveguide has an output port configured to receive the light signal from the array waveguide grating.

Still another embodiment of the optical component includes an input waveguide having an expansion region expanding from an input port through which the expansion region is configured to receive light signals to a multimode port. A function expressing the expansion from the input port to the multimode port includes a sinh function. An array waveguide grating is configured to receive a light signal from the expansion region of the input waveguide. An output waveguide has an output port configured to receive the light signal from the array waveguide grating.

A further embodiment of the optical component includes an input waveguide having an input port through which a light signal exits the input waveguide. An array waveguide grating is configured to receive the light signal from the input waveguide. An expansion region expands from an output port to a multimode port through which the expansion region is configured to receive the light signal from the array waveguide grating. A function expressing the expansion from the output port to the multimode port includes an exponential function.

Another embodiment of the optical component includes an input waveguide having an input port through which a light signal exits the input waveguide. An array waveguide grating is configured to receive the light signal from the input waveguide. An expansion region expands from an output port to a multimode port through which the expansion region is configured to receive the light signal from the array waveguide grating. A function expressing the expansion from the output port to the multimode port includes a sinh function.

Still another embodiment of the optical component includes a multimode interference device having a port with a port width. A waveguide is coupled with the multimode interference device. The waveguide expands from a narrow region to the port of the multimode device.

DETAILED DESCRIPTION OF THE PREFERRED EMBODIMENT

The invention relates to an optical component. The optical component includes an input waveguide having an expansion region that expands from an input port to a multimode port. The expansion region is configured to receive a light signal through the input port. An array waveguide grating is configured to receive the light signal from the multimode port of the expansion region. An output waveguide having an output port is configured to receive the light signal from the array waveguide grating.

Another embodiment of the optical component includes an input waveguide having an input port through which a light signal exits the input waveguide. An array waveguide grating is configured to receive the light signal from the input waveguide. The optical component also includes an output waveguide having an expansion region that expands from an output port to a multimode port. The multimode port of the expansion region is configured to receive the light signal from the array waveguide grating.

A width of the input port width is different from a width of the output port. Each pair of input ports and output ports is associated with a port width ratio which is the ratio of the input port width to the output port width. Because the input port width is different from the output port width, the port width ratio of the optical component is not equal to 1. Changing the port width ratio changes the bandwidth of the light signal received by the output waveguide of the optical component. For instance, increasing the port width ratio reduces the bandwidth while decreasing the port width ratio increases the bandwidth. Accordingly, the port width ratios can be adjusted to achieve a particular bandwidth.

The expansion region can include a multimode device. Alternatively, the expansion region can expand straight from the input port to the multimode port or from the output port to the multimode port. Alternatively, the expansion region can arc from the input port to the multimode port or from the output port to the multimode port. Suitable arcs include exponential arcs and sinh shaped arcs. Exponential arcs and sinh shaped arcs improve the intensity versus wavelength distribution of the light signal carried in the output waveguide. More specifically, exponential arcs and sinh shaped arcs have been shown to provide a more rectangular intensity versus wavelength distribution than other shapes.

Figure 1A:
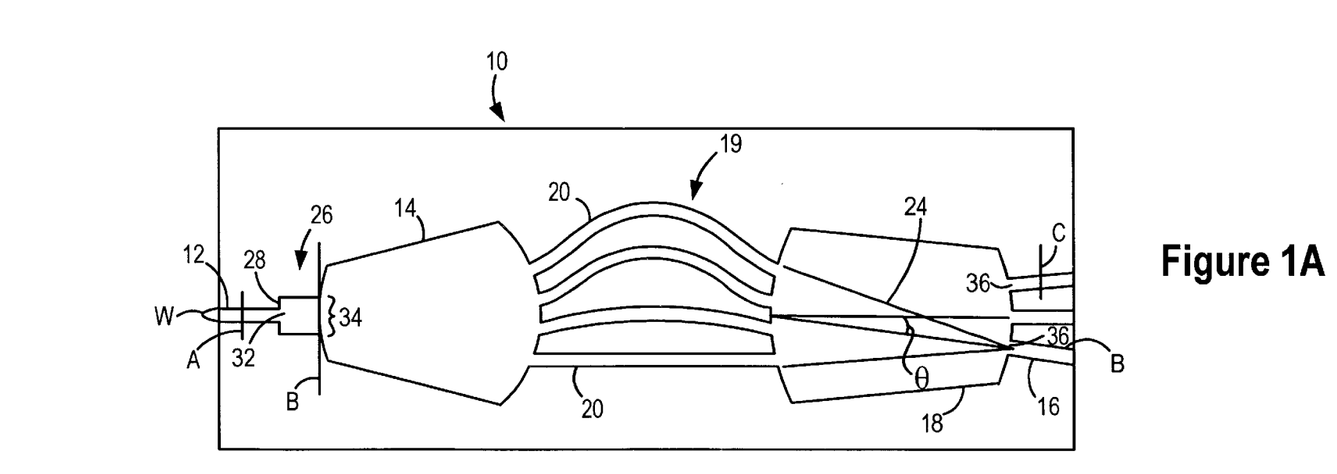
FIG. 1A illustrates an optical component having a plurality of output waveguides. The optical component is configured to produce light signals having a selected bandwidth on the output waveguides.

The invention relates to an optical component including an array waveguide grating. An example of an optical component that employs an array waveguide grating is a demultiplexer. FIG. 1A is a diagram of an optical component 10 including a demultiplexer. The optical component 10 includes an input waveguide 12 in optical communication with an input light distribution component 14 and a plurality of output waveguides 16 in optical communication with an output light distribution component 18. A suitable input light distribution component 14 and/or output light distribution component 18 includes, but is not limited to, star couplers, Rowland circles, mode expanders, slab waveguides and free space.

An array waveguide grating 19 connects the input light distribution component 14 and the output light distribution component 18. The array waveguide grating 19 includes a plurality of array waveguides 20. Adjacent array waveguides 20 have a different effective length. The effective length differential between adjacent waveguides is a constant, $\Delta L$. The array waveguides 20, the input waveguides 12 and the output waveguides 16 are each associated with a width, W. For the purposes of illustration, the width of the input waveguide 12 is labeled W. The input waveguides 12 and the output waveguides 16 can have the same or different dimensions. For instance, the width, W, of an input waveguide 12 can be different from the width, W, of an output waveguide 16. Although four array waveguides 20 are illustrated, array waveguide gratings 19 typically include more than four array waveguides 20 and fewer are possible. Increasing the number of array waveguides 20 can increase the degree of resolution provided by the optical component 10.

A single channel light signal is considered for the purposes of simplifying the discussion of operation of the optical component 10. The single channel input light signal enters the input light distribution component 14 from the input waveguide 12. The input light distribution component 14 distributes the light signal to the array waveguides 20. Each array waveguide 20 receives a fraction of the input light signal. Each array waveguide 20 carries the received light signal fraction to the output light distribution component 18. A light signal fraction traveling through a long array waveguide 20 will take longer to enter the output light distribution component 18 than a light signal fraction light traveling through a shorter array waveguide 20. Unless the length differential, $\Delta L$, between adjacent waveguides is a multiple of the light wavelength, the light signal fraction traveling through a long array waveguide 20 enters the output light distribution component 18 in a different phase than the light signal fraction traveling along the shorter array waveguide 20.

The light signal fractions entering the output light distribution component 18 from each of the array waveguide 20 combines to form an output light signal 24. Because the array waveguides 20 cause a phase differential between the light signal fractions entering the output light distribution component 18 from adjacent array waveguides 20, the output light signal 24 is diffracted at an angle labeled, $\theta$. The output light distribution component 18 is constructed to focus the output light signal 24 on a particular output waveguide 16. The output waveguide 16 on which the output light signal is focused is a function of the diffraction angle, $\theta$. As illustrated in FIG. 1A, the phase differential causes the output light signal 24 to be focused at the output waveguide 16 labeled B.

Because the length differential, $\Delta L$, is a different percentage of the wavelength, the amount of the phase differential is different for different channels. As a result, different channels are diffracted at different angles and are accordingly focused on different output waveguides 16. Hence, when a multichannel beam enters the output light distribution component 18, each of the different channels is focused on a different output waveguide 16.

The input waveguide includes an expansion region 26 that expands from an input port 32 to a multimode port 34. The multimode port 34 has dimensions associated with a light signal traveling in more than one mode. The input port 32 has dimensions associated with a light signal traveling in a single more. In some instances, the input port 32 has dimensions associated with a light signal traveling in more than one mode. Light signals traveling along the input waveguide enter the expansion region 26 through the input port 32 and exit the expansion region 26 through the multimode port 34. The input port 32 is located in a port side 28 and has an input port width, $W_i$. The port side 28 is wider than the input port width, $W_i$. A plurality of the output waveguides 16 include an output port 36 having an output port width, $W_o$. At least one of the output port widths, $W_o$, is different from the input port width, $W_i$.

Figure 1B:
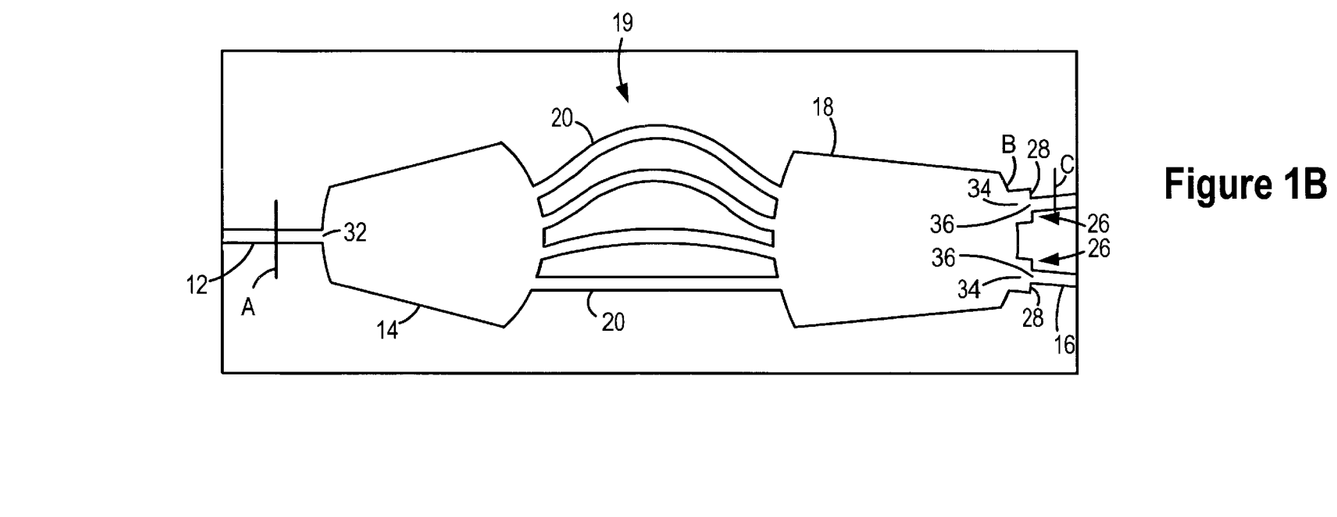
FIG. 1B illustrates another embodiment of an optical component configured to produce a selected bandwidth on the output waveguides.

FIG. 1B illustrates another embodiment of the optical component 10. The output waveguides include an expansion region 26 that expands from an output port 36 to a multimode port 34. The output port 36 can have dimensions associated with a light signal traveling in a single mode or in a plurality of modes. Light signals from the array waveguide grating can enter the expansion region 26 through the multimode port 34 and exit through the output port 36. The output port 36 is located in a port side 28 and has an output port width, $W_o$. The port side 28 is wider than the output port width, $W_o$. The input waveguide includes an input port 32 having an input port width, $W_i$. At least one of the output port widths, $W_o$, is different from the input port width, $W_i$.

Although FIG. 1B illustrates each output waveguide 16 including an expansion region 26, each output waveguide 16 need not include an expansion region 26. For instance, only a portion of the output waveguide 16 may be in optical communication with an expansion region 26. Further, when the optical component 10 includes a plurality of input waveguides 12, all, a portion, or none of the input waveguides 12 may be in optical communication with an expansion region 26.

The expansion region 26 provides the light signals in the output waveguides 16 with a substantially flat topped intensity versus wavelength profile as illustrated in FIG. 2A through FIG. 2D. When the portion of the input waveguide outside the expansion region has dimensions associated with a single mode condition, FIG. 2A can illustrate the intensity profile of the light signal in the portion of the input waveguide 12 outside of the expansion region 26. For instance, FIG. 2A could be the intensity profile of the light signal at the line labeled A in FIG. 1A or at the line labeled A in FIG. 1B. The intensity profile of the light signal is the intensity of the light signal across the width of a waveguide, W. The intensity profile in the input waveguide 12 has a single intensity peak.

Figures 2A, 2C:
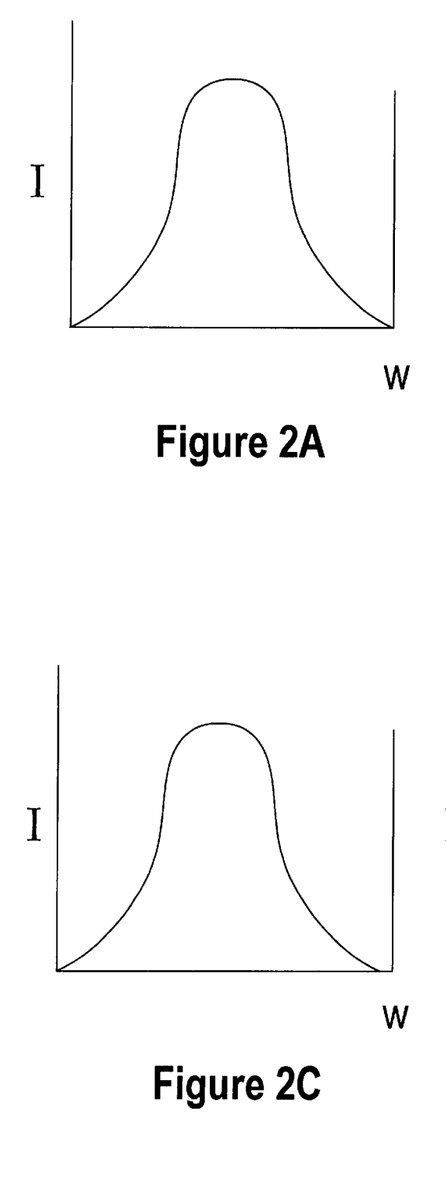
FIG. 2A illustrates the intensity profile of a light signal in an input waveguide of the optical component.
FIG. 2C illustrates the intensity profile of a light signal in an output waveguide of the optical component.
Figures 2B, 2D:
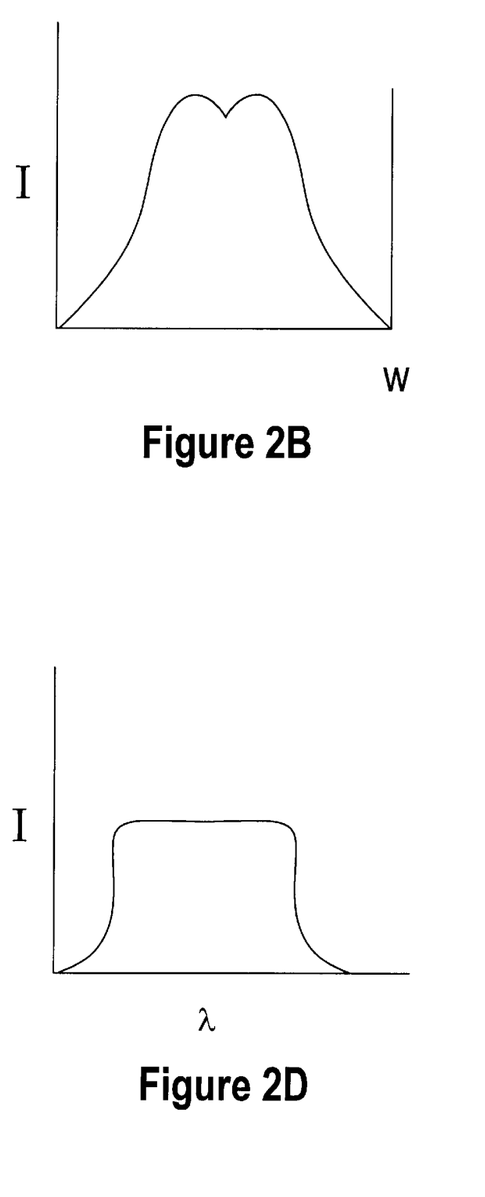
FIG. 2B illustrates the intensity distribution of a light signal in an expansion region in optical communication with a waveguide of the optical component.
FIG. 2D illustrates the intensity versus wavelength of a light signal in an output waveguide of the optical component.

FIG. 2B illustrates the intensity profile of the light signal at the multimode port 34. For instance, FIG. 2B could be the intensity profile at the line labeled B in FIG. 1A or in FIG. 1B. As noted above, the multimode port 34 has dimensions associated with a light signal traveling in more than one mode. Accordingly, light signals travel through the multimode port 34 in more than one mode. The modes interfere so as to from the plurality of intensity peaks evident in FIG. 2B.

FIG. 2C and FIG. 2D illustrate the characteristics of the light signal in the output waveguide 16. FIG. 2C illustrates the intensity profile at the line labeled C in FIG. 1A or in FIG. 1B. FIG. 2D shows the intensity versus wavelength profile of the light signal at the line labeled C in FIG. 1A or in FIG. 1B. The intensity profile shows a single intensity peak. The light signal has a substantially flat topped intensity versus wavelength profile. The substantially flat topped intensity versus wavelength profile results from the multi peak intensity profile in the expansion region 26.

Because the signals associated with each channel have a flat top shape, a shift in the wavelengths of light that are carried by a particular output waveguide 16 do not result in a change in the intensity of light carried in the output waveguide 16. As a result, the optical component 10 is associated with a reduced degree of optical loss resulting from shifts in the wavelengths carried on a particular output waveguide 16.

In each of the embodiments shown above, the width of the input port 32 can be different than the width of the output port 36. When the width of the input port 32 is different than the width of the output port 36, the difference in the widths is greater than the difference that results from variations in the fabrication process. Additionally, the port width ratio is not equal to 1 when the width of the input port 32 is different than the width of the output port 36. The port width ratio is the ratio of the input port width to the output port width, $W_i/W_o$ for a particular output waveguide 16 and a particular input waveguide 12. Changing the port width ratio changes the bandwidth of the light signal carried in an output waveguide 16. For instance, increasing the port width ratio reduces the bandwidth while decreasing the port width ratio increases the bandwidth. Suitable input port widths and/or output port widths are on the order of 10 $\mu$m. Suitable port width ratios include, but are not limited to ratios greater than 1.01, 1.05, 1.1, 1.2 or less than 0.99, 0.95, 0.9 or 0.8.

The above relationships for the port width ratio can be used to design the optical component 10 such that the light signals on each output waveguide 16 have a particular bandwidth. For instance, the output port width, $W_o$, can be selected to provide a particular bandwidth on a particular output waveguide 16. Because it may be desirable for different output waveguides 16 to carry light signals with different bandwidths, different output waveguides 16 can have different output port widths, $W_o$. For instance, when there are a plurality of output waveguides 16 receiving light signals from an input waveguide 12, each output waveguide 16 can carry light signals with a different bandwidth by selecting the output port width, $W_o$, for each output waveguide 16 to produce the port width ratio that results in the desired bandwidth on that output waveguide 16.

Figure 3A:
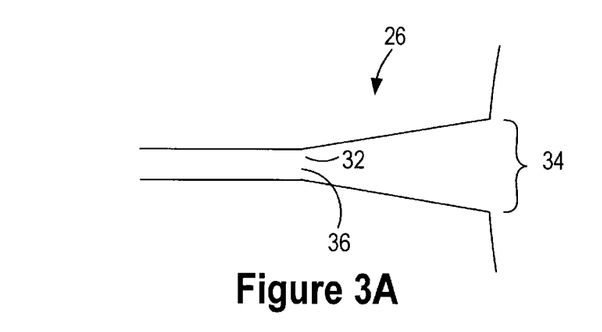
FIG. 3A illustrates an expansion region with a straight expansion from an input port to a multimode port.
Figure 3B:
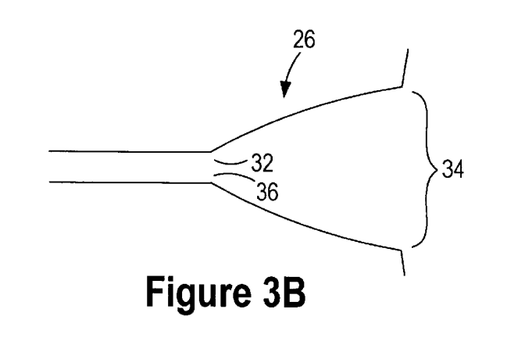
FIG. 3B illustrates an expansion region with a curved expansion from an input port to a multimode port.

The expansion region 26 illustrated in FIG. 1A and FIG. 1B includes a multimode device, however, the expansion region 26 can include a straight expansion from an input port 32 to a multimode port 34 as shown in FIG. 3A or from an output port 36 to a multimode port 34. Alternatively, the expansion region 26 can include a curved expansion from a multimode port 34 as shown in FIG. 3B or from an output port 36 to a multimode port 34.

Figure 3C:
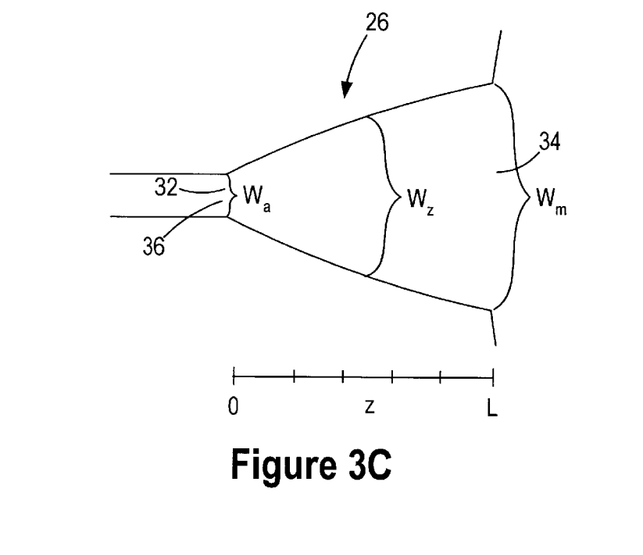
FIG. 3C illustrates the dimensions of an expansion region suitable for use with Equation 1 or Equation 2.

In some instances, the expansion of the expansion region 26 can be expressed as a mathematical function. Suitable functions for curved expansions can include exponential functions and/or sinh functions. Exponential expansions and sinh function expansions have been shown to provide a more rectangular intensity versus wavelength profile on an output waveguide than other expansions. Equation 1 provides an example of a suitable exponential function where $\alpha$, $\beta$ and $\gamma$ are constants, where L is the length of the expansion region 26 and where the relationship of z to the expansion region 26 is shown in FIG. 3C. Equation 2 provides an example of a suitable sinh function. A suitable α includes, but is not limited to $W_u$, and a suitable β includes, but is not limited to $W_u$–$W_m$ where $W_m$ is the width of the multimode port and $W_u$ can be the input port width, $W_i$, or output port width, $W_o$. A suitable γ includes, but is not limited to, 1.1–30. Larger values of γ can be selected to excite more than two modes for the flat top spectral designs.

The function expressing the expansion of the expansion region 26 can be limited to an exponential function or limited to a sinh function. Alternatively, the function expressing the expansion can include combinations of Equation 1 and Equation 2. These combinations can be selected to optimize the performance of the expansion region. Suitable combinations of Equation 1 and Equation 2 include, but are not limited to, linear combinations. Additionally, Equation 1 and Equation 2 can be combined with other constants or functions.

$$w(z) = \alpha + \beta \frac{\exp\left(\frac{z\gamma}{L}\right) - 1}{\exp(\gamma) - 1} \quad (1)$$

$$w(z) = \alpha + \beta \frac{\sinh(z\gamma)}{\sinh(\gamma L)} \quad (2)$$

Although FIG. 3A and FIG. 3B do not show the input port 32 or the output port 36 located in a port side 28 of an expansion region 26, the input port 32 or the output port 36 of an expansion region 26 can be located in a port side that is wider than the input port width, $W_i$, or wider than the output port width, $W_o$.

Figure 4:
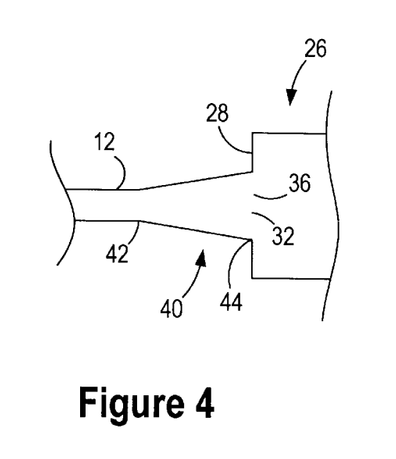
FIG. 4 illustrates a waveguide in optical communication with an expansion region. The waveguide includes a flared section expanding from a narrow region to a wide region.

When a port side 28 of an expansion region 26 is wider than the input port width, $W_i$, or wider than the output port width, $W_o$, the input waveguide 12 and/or the output waveguides 16 can include a flared section 40 for reducing excitation of higher order modes as shown in FIG. 4. The flared sections 40 have sides expanding from a narrow region 42 having a narrow region width to a wide region 44 having a wide region width. Although the wide region 44 is shown as being connected to an expansion region 26, the wide region 44 can also be connected to the input light distribution component 14 or the output light distribution component 18. Further, the waveguide can include a straight section positioned between the wide region 44 and the expansion region 26; however, the straight region can increase the portion of the waveguide carrying multiple modes.

The sides of the flared section 40 can be straight or can be curved. Suitable curves include, but are not limited to, exponential and parabolic curves. Each flared section 40 is associated with a flared section width ratio that is the ratio of the wide region width to the narrow region width. The flared section width ratio depends on the width of the input port 32 or on the width of the output port 36. For instance, a flared section 40 need not be used when the input port width or the output port width is not associated with excitation of higher order modes. In some instances, the flared section width ratio is greater than 1.01, 1.05, 1.1, 1.2 or 1.3.

The flared sections 40 of the input waveguides 12 can expand so as to reduce excitation of higher order modes. For instance, the sides of the flared section 40 are constructed so as to provide a smooth expansion of the light signals rather than an abrupt expansion of the light signals. The flared section 40 allows the input waveguide 12 to have a width that is not associated with excitation of higher order modes while having an input port 32 that is wide enough to provide the desired bandwidth.

The flared section 40 of the output waveguides 16 contract such that higher order modes are transformed into the fundamental mode. For instance, the sides of the flared section 40 are constructed so as to provide a smooth contraction of the light signals rather than an abrupt contraction of the light signals. The flared section 40 allows the output waveguide 16 to have a width that is not associated with excitation of higher order modes while having an output port 36 that is wide enough to provide the desired bandwidth.

The wide region width can match the width of the port side 28 of the expansion region 26. This arrangement provides a smooth transition from the flared section 40 to the multimode region.

Although FIG. 4 illustrates each of the input waveguides 12 and each of the output waveguides 16 as having flared sections 40, in some instances, only the input waveguide(s) 12 have flared sections 40 in some instances. Further, only the output waveguide(s) 16 have flared sections 40 in other instances. Additionally, each of the input waveguides 12 and/or each of the output waveguides 16 need not have a flared section 40. For instance, a portion of the output waveguides 16 and/or a portion of the input waveguides 12 can have flared sections 40. Further, the optical component 10 can be configured such that the only input waveguides 12 having flared sections 40 are the input waveguides 12 having input port widths, $W_i$, associated with excitation of higher order modes. Further, the optical component 10 can be configured such that the only input waveguides 12 having flared sections 40 are the output waveguides 16 having output port widths, $W_i$, associated with excitation of higher order modes.

Figure 5A:
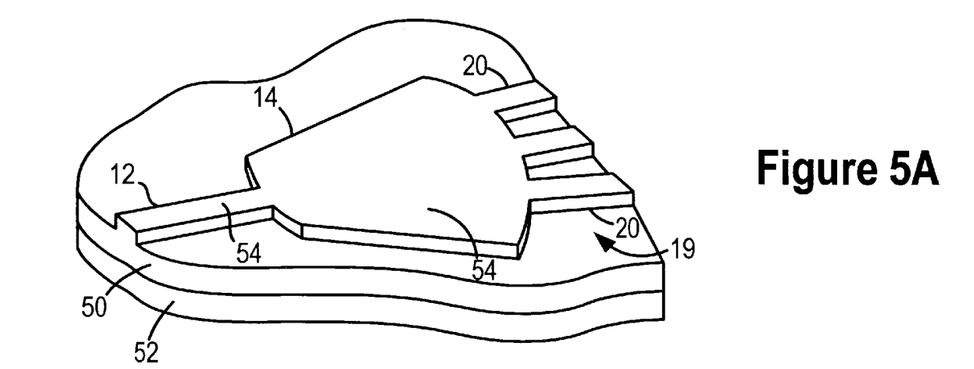
FIG. 5A is an example of a suitable optical component construction.
Figure 5B:
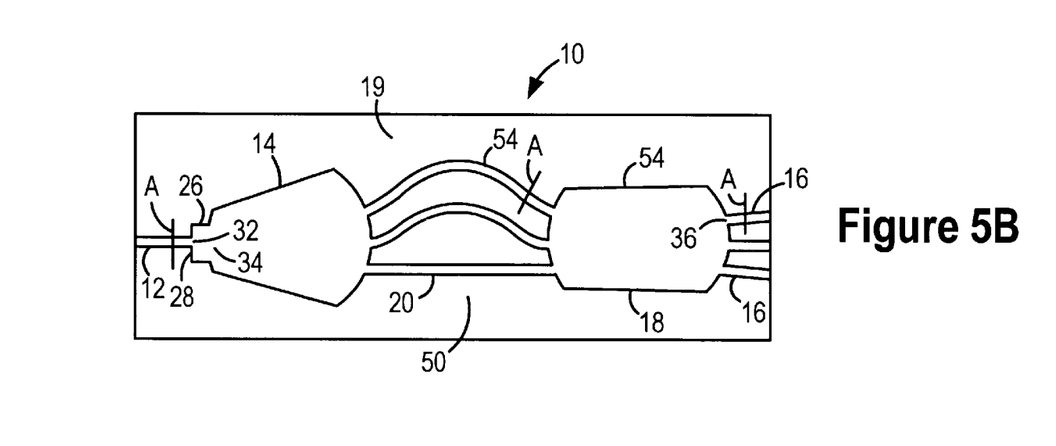
FIG. 5B is a topview of an optical component constructed according to FIG. 5A.
Figure 5C:
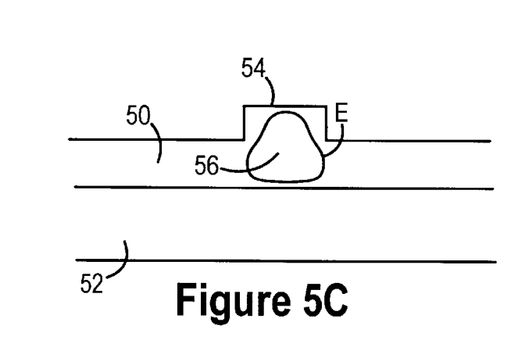
FIG. 5C is a cross section of the optical component shown in FIG. 5B.

FIG. 5A through FIG. 5D illustrate a suitable construction for an optical component 10 according to the present invention. A portion of the arrayed waveguide is shown on the optical component 10. The illustrated portion has an input light distribution component 14, an input waveguide 12 and a plurality of array waveguides 20. FIG. 5B is a topview of the optical component 10. FIG. 5C is a cross section of the optical component 10 in FIG. 5B taken at any of the lines labeled A. Accordingly, the waveguide illustrated in FIG. 5C could be the cross section of an input waveguide 12, an array waveguide 20 or an output waveguide 16.

For purposes of illustration, the array waveguide grating 19 is illustrated as having three array waveguides 20 and three output waveguides 16. However, array waveguide gratings 19 for use with the optical component 10 can have many more than three array waveguides 20. For instance, array waveguide gratings 19 can have tens to hundreds or more array waveguides 20.

The optical component 10 includes a light transmitting medium 50 formed over a base 52. The light transmitting medium 50 includes a ridge 54 that defines a portion of the light signal carrying region 56 of a waveguide. Suitable light transmitting media include, but are not limited to, silicon, polymers silica, SIN, GaAs, InP and LiNbO$_3$. The base 52 includes a material that reflects light signals from the light signal carrying region 56 back into the light signal carrying region 56. As a result, the base 52 also defines a portion of the light signal carrying region 56. The line labeled E illustrates the profile of a light signal carried in the light signal carrying region 56 of FIG. 5C. The light signal carrying region 56 extends longitudinally through the input waveguide 12, the input light distribution component, each the array waveguides 20, the output light distribution component and each of the output waveguides 16.

Figure 5D:
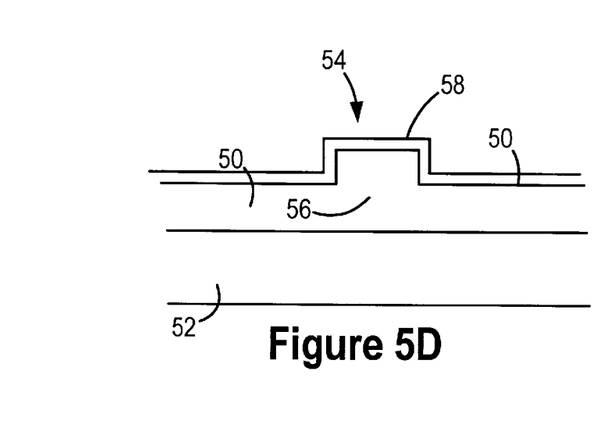
FIG. 5D illustrates an optical component having a cladding layer.

A cladding layer 58 can be optionally be positioned over the light transmitting medium 50 as shown in FIG. 5D. The cladding layer 58 can have an index of refraction less than the index of refraction of the light transmitting medium 50 so light signals from the light transmitting medium 50 are reflected back into the light transmitting medium 50.

Figure 6:
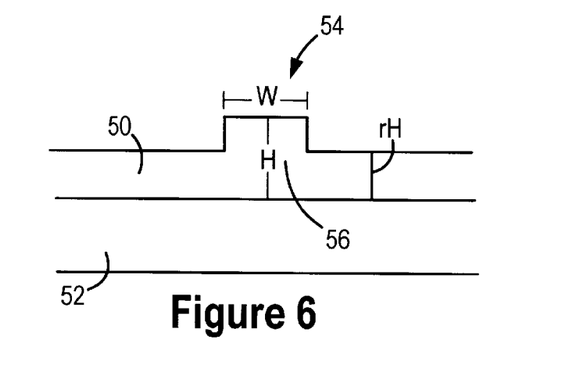
FIG. 6 illustrates waveguide or expansion region dimensions that produce excitation of multiple modes.

FIG. 6 illustrates the various dimensions of waveguides constructed according to FIG. 5A through FIG. 5D. The waveguide has a height, H, a width W and a thickness expressed as r*H. When r is greater than or equal to 0.5, Equation 3 can be used to determine the dimensions of the waveguide needed to retain a single mode in a waveguide. When the dimensions of the waveguide are selected so Equation 3 is not true, multiple modes can be excited. As a result, Equation 3 can also be used to determine the dimensions of the multimode port 34. When r is less than 0.5, the solution for W/H becomes more complex and a numerical or experimental solution is often required.

$$\frac{W}{H} \le .3 + \frac{r}{\sqrt{1-r^2}} \quad (3)$$

Although the optical components 10 shown above have a single input waveguide 12, the optical component 10 can include a plurality of input waveguides 12. For instance, many demultiplexers include a plurality of input waveguides 12. The optical component 10 can include as few as one output waveguide 16. Examples of optical components 10 having an array waveguide grating 19 and a single output waveguide 16 include filters and dispersion compensators. An example of a filter employing an array waveguide grating is disclosed in U.S. patent Ser. No. 09/845685; entitled "Tunable Filter"; filed on Apr. 30, 2001 and incorporated herein in its entirety. An example of a dispersion compensator employing an array waveguide grating is disclosed in U.S. patent Ser. No. 09/866491; entitled "Dispersion Compensator"; filed on May 25, 2001 and incorporated herein in its entirety. When the optical component 10 does not include a demultiplexer, the array waveguide grating 19 need not be constructed with the constant length differential, ΔL, condition described above.

A suitable input 12 waveguide can include only an expansion region 26. Further, a suitable output waveguide 16 can include only an expansion region 26.

Although the optical component is disclosed in the context of the output port having dimensions that are different from dimensions of the input port, in some instances, the dimensions of the output port are the same as the dimensions of the input port.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. An optical component, comprising:
    an input waveguide having an expansion region configured to receive a light signal through an input port, the expansion region expanding from an input port to a multimode port, a function expressing the expansion from the input port to the multimode port including a sinh function;
    an array waveguide grating configured to receive a light signal from the expansion region of the input waveguide; and
    an output waveguide having an output port configured to receive the light signal from the array waveguide grating, the output port having dimensions that are different from dimensions of the input port.

2. A The component of claim 1, wherein the output port has an output port width that is different from a width of the input port.

3. The component of claim 1, wherein the input port has dimensions associated with the light signal traveling in a single mode.

4. The component of claim 1, wherein the expansion region includes a multimode device.

5. The component of claim 4, further comprising:
    a flared section connected to the input port, the flared section contracting from the input port to a narrowed region.

6. The component of claim 5, wherein the narrowed region has dimensions associated with a single mode condition and the input port has dimensions associated with a multimode condition.

7. The component of claim 1, wherein the output waveguide includes a flared section expanding from a narrow region to the output port.

8. The component of claim 1, wherein the input waveguide, the array waveguide grating and the output waveguide are formed in a light transmitting medium positioned over a substrate.

9. An optical component, comprising:
    an input waveguide having an input port through which a light signal exits the input waveguide;
    an array waveguide grating configured to receive the light signal from the input waveguide; and
    an expansion region expanding from an output port to a multimode port configured to receive the light signal from the array waveguide grating, a function expressing the expansion from the output port to the multimode port including a sinh function, the output port having dimensions different from dimensions of the input port.

10. The component of claim 9, wherein the output port has an output port width that is different from a width of the input port.

11. The component of claim 9, wherein the output port has dimensions associated with the light signal traveling in a single mode.

12. The component of claim 9, wherein the expansion region is a multimode device.

13. The component of claim 12, further comprising:
    a flared section connected to the output port, the flared section contracting from the output port to a narrowed region.

14. The component of claim 13, wherein the narrowed region has dimensions associated with a single mode condition.

15. The component of claim 13, wherein the flared section expands from the narrow region to the output port.

16. The component of claim 9, wherein the input waveguide includes a flared section expanding from a narrow region to a wide region.

17. The component of claim 9, wherein the input waveguide is one of a plurality of input waveguides.

18. An optical component, comprising:
    an input waveguide having an expansion region expanding from an input port through which the expansion region is configured to receive light signals to a multimode port, a function expressing the expansion from the input port to the multimode port including a sinh function; and an array waveguide grating configured to receive a light signal from the expansion region of the input waveguide; and an output waveguide having an output port configured to receive the light signal from the array waveguide grating.

19. An optical component, comprising:

an input waveguide having an input port through which a light signal exits the input waveguide;

an array waveguide grating configured to receive the light signal from the input waveguide; and an expansion region expanding from an output port to a multimode port through which the expansion region is configured to receive the light signal from the array waveguide grating, a function expressing the expansion from the output port to the multimode port including a sinh function.

20. The component of claim 18, wherein the input port has dimensions associated with the light signal traveling in a single mode.

21. The component of claim 18, wherein the expansion region includes a multimode device.

22. The component of claim 18, further comprising:

a flared section connected to the input port, the flared section contracting from the input port to a narrowed region.

23. The component of claim 22, wherein the narrowed region has dimensions associated with a single mode condition and the input port has dimensions associated with a multimode condition.

24. The component of claim 18, wherein the output waveguide includes a flared section expanding from a narrow region to the output port.

25. The component of claim 19, wherein the output port has dimensions associated with the light signal traveling in a single mode.

26. The component of claim 19, wherein the expansion region is a multimode device.

27. The component of claim 19, further comprising:

a flared section connected to the output port, the flared section contracting from the output port to a narrowed region.

28. The component of claim 27, wherein the narrowed region has dimensions associated with a single mode condition.

29. The component of claim 27, wherein the flared section expands from the narrow region to the output port.

30. The component of claim 19, wherein the input waveguide includes a flared section expanding from a narrow region to a wide region.

31. The component of claim 19, wherein the input waveguide is one of a plurality of input waveguides.

* * * * *